United States Patent [19]

Hutson, Jr. et al.

[11] 3,771,966

[45] Nov. 13, 1973

[54] APPARATUS FOR DIMERIZATION OF $C_2$ TO $C_{10}$ OLEFINS WITH DEPOSITED CATALYST

[75] Inventors: Thomas Hutson, Jr.; Cecil O. Carter, both of Bartlesville, Okla.

[73] Assignee: Phillips Petroleum Company, Bartlesville, Okla.

[22] Filed: June 28, 1971

[21] Appl. No.: 157,365

Related U.S. Application Data

[62] Division of Ser. No. 823,618, May 12, 1969, Pat. No. 3,631,121.

[52] U.S. Cl. .................. 23/260, 23/288 E, 23/289, 260/683.15 D, 23/263
[51] Int. Cl. ........................... C07c 3/10, B01j 1/00
[58] Field of Search ................. 23/263, 260, 288 E, 23/289; 260/683.15 D

[56] References Cited
UNITED STATES PATENTS 2,371,477  3/1945  Souders, Jr. et al. ................. 23/260
2,918,508  12/1959  Coopersmith et al. ........... 23/260 X
2,374,511  4/1945  Upham .......................... 23/288 E X

*Primary Examiner*—James H. Tayman, Jr.
*Attorney*—J. Arthur Young et al.

[57] ABSTRACT

In the dimerization of $C_2$ to $C_{10}$ olefins in a loop reactor, the improvement comprising running the reactor hotter than normal for a short period of time until catalyst and polymer are deposited on the walls of the loop reactor making the reactor more selective for dimerization, and then returning to the usual reaction temperatures. As a second feature, by running the effluent from the loop reactor through a fixed bed of ion exchange resin, some of the catalyst from the stream deposits on the ion exchange resin, and there acts as a second catalyst bed selective for dimerization.

4 Claims, 1 Drawing Figure

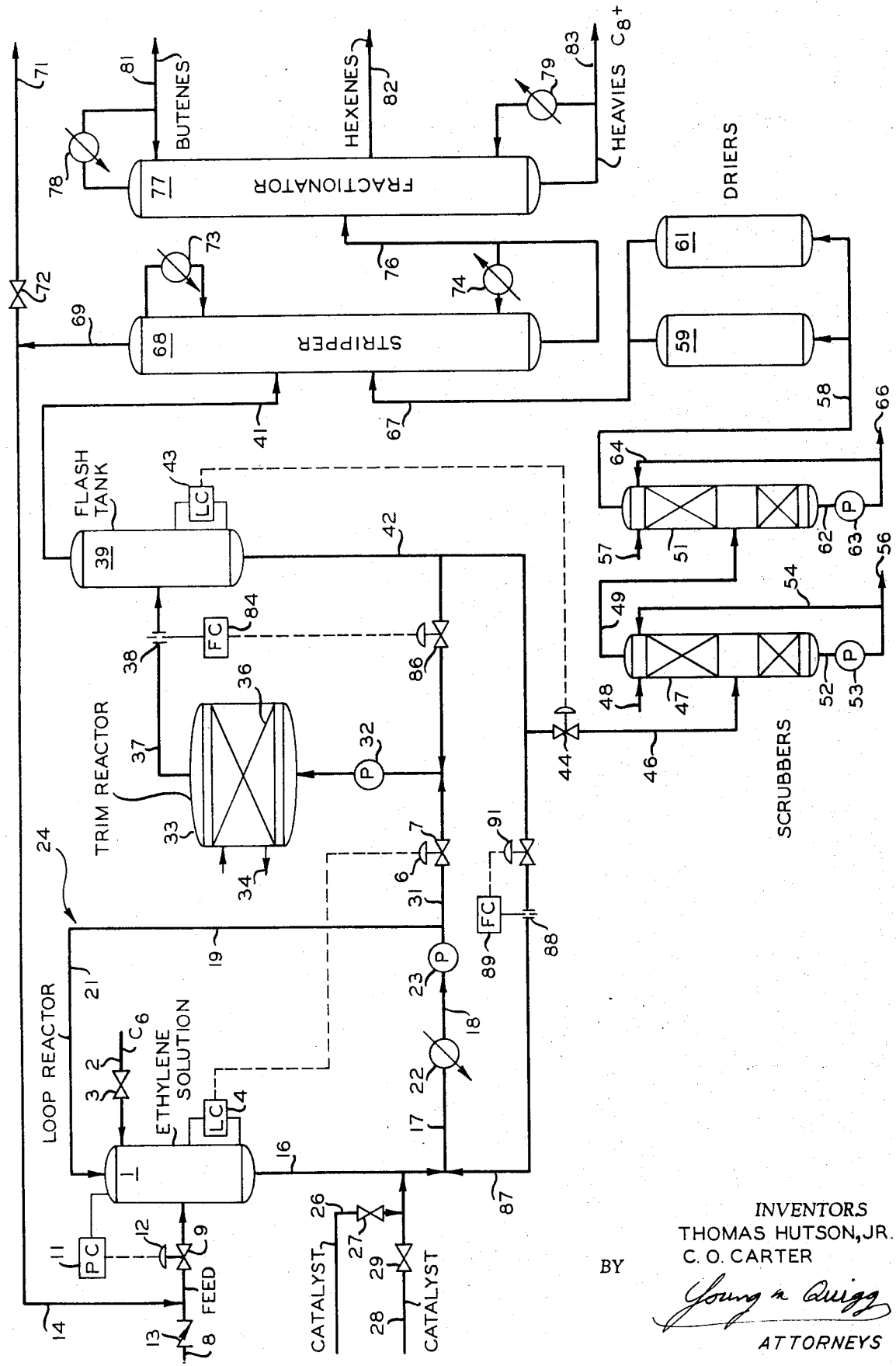

3,771,966

APPARATUS FOR DIMERIZATION OF $C_2$ TO $C_{10}$ OLEFINS WITH DEPOSITED CATALYST

This application is a divisional application of Ser. No. 823,618, filed May 12, 1969, now U.S. Pat. No. 3,631,121, issued Dec. 28, 1971.

DISCLOSURE:

Field of the Invention

This invention relates to dimerization of olefins in a loop reactor and/or fixed bed reactor.

SUMMARY OF INVENTION

In the dimerization of $C_2$ to $C_{10}$ olefins in a loop reactor, the improvement comprising running the reactor hotter than normal for a short period of time until catalyst and polymer are deposited on the walls of the loop reactor making the reactor more selective for dimerization, and then returning to the usual reaction temperatures. As a second feature, by running the effluent from the loop reactor through a fixed bed of ion exchange resin, some of the catalyst from the stream deposits on the ion exchange resin, and there acts as a second catalyst bed selective for dimerization.

BRIEF DESCRIPTION OF THE DRAWINGS

The single FIGURE of the drawing is an elevational view of preferred apparatus comprising a loop reactor and a fixed bed trim reactor receiving the effluent from the loop reactor, used in the selective dimerization of $C_2$ to $C_{10}$ olefins, particularly for the dimerization of ethylene.

DESCRIPTION OF THE PREFERRED EMBODIMENT

In the drawing, in order to start up, it is preferred to fill the ethylene or other selected olefin solution vessel 1 with a hydrocarbon liquid, such as normal hexane, or any one of, or any mixture of, light paraffinic, olefinic, or aromatic hydrocarbons which are liquid at about 300 psig at about 70° F. The filling is from line 2 through valve 3, until liquid level control 4 indicates a liquid level at a predetermined elevation in vessel 1 by actuating the motor 6 opening valve 7. Then valve 3 is closed, and the system is ready to start.

Gaseous dry ethylene or other selected olefin feed from line 8 enters the system through valve 9 whenever the pressure in vessel 1 falls below about 300 psig at pressure recording controller 11 which then operates motor 12 to open valve 9. A check valve 13 in line 8 prevents recycle ethylene or other selected olefins in line 14 from going through valve 13 into the dry ethylene or other selected olefin source. The selected olefin may be any $C_2$ to $C_{10}$ olefin, or any mixture of them, as all are operative in the process of the present application.

Vessel 1, pipes 16, 17, 18, 19 and 21, heat exchanger 22, and pump 23 are connected in a closed loop forming what is known as a loop reactor, generally designated as 24. Loop reactors are old; see parts 18, 19, 20 and 21 of Coopersmith et al. U.S. Pat. No. 918,508, Dec. 22, 1959.

In order to initiate the dimerization reaction, suitable amounts of one, two, or more suitable catalysts are injected into pipe 16, for example ethyl aluminum dichloride catalyst through line 26 and valve 27 and tri-n-butyl phosphine nickel dichloride catalyst through line 28 and valve 29. Ethylene, or whatever olefin is to be dimerized, such as a $C_2$ to $C_{10}$ olefin, is added to loop reactor 24 through line 8 and valve 9. The inside surface of loop reactor 24 is then coated with a third catalyst comprising said first two catalysts mixed with a heavy polymer formed by operating the loop reactor 24 at temperatures of 135° to 200° F. for 60 to 10 hours, and preferably from 135° to 160° F. for 60 to 20 hours, respectively, the hotter the temperature the shorter the time of operation necessary to deposit the third catalyst on the walls of the loop reactor 24.

The catalysts preferably employed may be any of those covered by the claims of Cannell et al. U.S. Pat. No. 3,355,510 of Nov. 28, 1967, namely any hydrocarbon soluble nickel compound mixed with any alkyl aluminum halide. The solid polymer deposited with the catalyst on the walls of the loop reactor 24 obviously is a polymer of the olefin being treated at the high temperature of 135° to 200° F. At the normal dimerization temperature of 40° to 130° F., preferably 65° to 125° F., very small and negligible amounts of this solid polymer will be formed with the catalyst preferably employed present, as they are, then selective to dimerization instead of solid polymerization of the olefin present at that temperature. The deposit on the walls of the loop reactor 24 produced by the process of the present invention makes the system even more selective to dimerization when operated between 40° and 130° F. than the system would be without said deposit produced only by the solid polymer depositing period of 10 to 60 hours at elevated temperatures of 135° F. to 200° F. The time needed for deposit of solid polymer and also the time for dimerization increases from the $C_2$ to the $C_{10}$ hydrocarbons, so operations with the $C_2$ to $C_4$ hydrocarbons are preferred.

Other known dimerization catalysts are employed successfully in the process of the present invention, and are deposited in a layer of solid olefin polymer on the walls of the loop reactor at the named elevated temperatures, and the deposit acts as an increased dimerization selectivity catalyst at the above named normal dimerization temperatures, the same as the preferred catalysts of the preceding paragraph.

As the liquid level rises in vessel 1, control 4 opens valve 7 in product withdrawal line 31 from loop reactor 24, and the product is pumped by pump 32 through trim reactor generally designated as 33. Reactor 33 is cooled by indirect heat exchange with cooling water in cooling coil 34. The product from 32 passes through a fixed bed in reactor 33, the bed preferably being any known ion exchange resin of the prior art. As such resin, Amberlyst 15 made by Rohm & Haas Company is preferred. However, any non-aqueous type ion exchange resin may be used successfully in the present invention.

Amberlyst 15 is a marco-reticular ion exchange resin often used as a catalyst.

Ion exchange resins are insoluble crosslinked polymers of various types in bead form. They are available in various grades ranging from strong acids to strong bases and of varyingg exchange capacity and porosity. They remove cations or anions from aqueous and non-aqueous solutions, are reversible, and can be regenerated and used again.

While better results are obtained with ion exchange resin in the trim reactor, such as Amberlyst 15, or any Amberlite made by Rohm & Haas Company, useful results in the practice of this invention can be obtained with any solid packing material in the trim reactor, such as sand, diatomaceous earth, bauxite, attapulgus clay, ion exchange resins, molecular sieves, stainless steel wool, broken glass, or glass wool.

While some of the catalyst is collected on packing 36, some passes out overhead line 37 through flow meter 38 into product flash tank 39 where the $C_2$ to $C_4$ hydrocarbons vaporize and pass out overhead line 41, while the heavier hydrocarbons, polymers, and soluble catalyst pass out the lower line 42 whenever liquid level control 43 finds the liquid level in tank 39 exceeds a set point and opens motor valve 44 in response thereto.

Liquid passing valve 44 into line 46 enters a first catalyst removal scrubber 47, preferably filled with packing, where it is washed with a dilute acid solution 48. Any dilute acid may be employed, preferably hydrochloric, nitric or sulfuric acid. A 1 per cent solution in water is preferred, and hydrochloric acid is preferred.

The hydrocarbon phase passes out the overhead line 49 of the acid scrubber into a caustic scrubber 51. The aqueous phase passes out the bottom line 52 to pump 53 which recycled some to scrubber 47 through recycle line 54 and discharges the remainder through line 56 to a sewer.

The liquid in line 49 is scrubbed in scrubber 51 with a dilute caustic solution 57. Any dilute caustic can be used, such as alkali metal, alkaline earth metal, or ammonium hydroxides, or amides. A 1 per cent solution in water is preferred, and sodium hydroxide is preferred.

The catalyst-free overhead hydrocarbon phase is passed through line 58 to one of driers 59 or 61, the other drier being regenerated in the conventional manner. As the particular drier employed is not critical to the invention, no further description is believed necessary. Driers 59 and 61 can contain fixed beds of bauxite, or other regeneratable desiccant material.

The aqueous phase 62 emerges from the bottom of scrubber 51 and part is recycled by pump 63 through line 64, and part sent to the sewer through line 66.

Hydrocarbons from driers 59 and 61 pass through line 67 into ethylene stripper column 68 while $C_2$ to $C_4$ hydrocarbons enter column 68 from line 41. Ethylene passes overhead from column 68 through line 69, any excess can be drawn off through line 71 through valve 72, the remainder recycled to the loop reactor 24 through line 14, and any ethylene needed can be added from valve 13 and line 8.

Column 68 can be provided with a reflux condenser 73 and/or a reboiler 74 of conventional construction. The deethanized hydrocarbons pass out bottom line 76 into product fractionator 77 which may also have conventional reflux condenser 78 and reboiler 79, and has an overhead product line 81 for $C_3$ and $C_4$ hydrocarbons, an intermediate product line 82 for $C_5$, $C_6$ and $C_7$ hydrocarbons, and a kettle product line 83 for $C_8$ and heavier hydrocarbons. Obviously, if desired, these hydrocarbons may be split into different groups, or the fractionation can be made into many product lines (not shown) with $C_4$, $C_5$, $C_6$, $C_7$, $C_8$, $C_9$ and $C_{10}$ and heavier, each coming out a separate product line.

As the specific fractionation system employed at 68 and 77 is not critical to the invention, no further description is necessary as it is just conventional fractionation into whatever products present are desired, except that in line 69 only ethylene is recycled.

While not essential to the operation of the invention, various controls are described solely because it is applicants' duty to teach the best way to practice his invention. Obviously, as loop reactor 24 produces dimer, it is necessary to drain liquid through valve 7 controlled by liquid level control 4. As this liquid increases in tank 39, it is then necessary to drain it off to fractionation through valve 44 controlled by liquid level control 43. While not essential, it is preferred to keep pump 32 loaded regardless of whether valve 7 is open or closed, and this is done by measuring flow at 38 and keeping it constant by means of flow rate controller opening or closing valve 86. While not essential, it is preferred to have a constant recycle of liquid from line 42 to loop reactor 24 through line 87 measured by flow meter 88 and controlled by flow rate controller 89 and valve 91.

EXAMPLE

The system was run with loop reactor 24 at an average temperature of about 160° F. for 24 hours, which formed a catalyst coating about 3 mils thick on the interior walls of said loop reactor. Chemical analysis showed the coating to be about 40 per cent highly cross linked polymer substantially insoluble in hydrocarbons, the remainder being catalyst and residue. The same feed rates were used in the 24 hours at 160° F. and in the ensuing normal temperature run at 79.5° F.

The feed rates were:

TABLE I

| Material | Place of Addition | Rate in lb./hour |
|---|---|---|
| Ethylene | 8 | 6.68 |
| EAD | 27 | 0.0001431 |
| Pentane | 27 | 0.0654 |
| TBP-NiCl$_2$ | 29 | 0.0000391 |
| Pentane | 29 | 0.0654 |

TABLE II

Ethylene Dimerization at Normal Temperature

| | Coated | Not Coated |
|---|---|---|
| Process Conditions: | | |
| Length of run | 11 hours | 11 |
| Temperature of reactor | 79.5° F. | 80 |
| Pressure in reactor | 299 psig | 300 |
| Residence time in reactor | 46.3 min. | 46.3 |
| Catalyst Molecular Ratio: | | |
| Al/Ni | 15.4 | 15.4 |
| Conversion and Yields: | | |
| Ethylene Conversion | 73.0% | 73.0 |
| Butene Selectivity | 85.4% | 76.9 |
| Hexene Selectivity | 12.9% | 20.0 |
| $C_8$+ Selectivity | 1.7% | 3.1 |
| $C_4$= Yield | 62.3% | 56.1 |
| $C_6$= Yield | 9.4% | 14.6 |
| $C_8$+ Yield | 1.3% | 2.3 |
| Total Product | 124700 lb./lb. Ni Comp. | |
| Product Analysis in Line 31: | | |
| $C_2$= weight % | 26.5 | 26.5 |
| $C_4$= weight % | 61.1 | 55.1 |
| nC$_5$ weight % | 1.9 | 1.9 |
| $C_6$= weight % | 9.2 | 14.3 |
| $C_8$+ weight % | 1.3 | 2.2 |
| Total | 100.0 | 100.0 |
| Product Analysis in line 37: | | |
| $C_2$=, wt. % | 9.3 | 9.3 |
| $C_4$=, wt. % | 70.9 | 64.9 |
| nC$_5$, wt. % | 1.9 | 1.9 |
| $C_6$=, wt. % | 15.1 | 20.2 |
| $C_8$+, wt. % | 2.8 | 3.7 |
| Total | 100.0 | 100.0 |
| Conversion and Yields in line 37: | | |
| Ethylene Conversion | 90.5% | 90.5% |
| Butene Selectivity | 79.8% | 73.1% |
| Hexene Selectivity | 17.0% | 22.7% |
| $C_8$+ Selectivity | 3.2% | 4.2% |
| $C_4$= Yield | 72.2% | 66.2% |
| $C_6$= Yield | 15.4% | 20.5% |
| $C_8$+ Yield | 2.9% | 3.8% |
| Product Yields | | |
| Butenes in line 81 | 5.33 lb./hr. | 4.88 lb./hr. |
| Hexenes in line 82 | 1.14 lb./hr. | 1.52 lb./hr. |

| | | |
|---|---|---|
| $C_8+$ in line 83 | 0.21 lb./hr. | 0.28 lb./hr. |

The data in the second column of Table II headed "Coated" is actual data recorded during an actual run. The data in the third column headed "Not Coated" is calculated from actual data obtained in a run at 147 psig taking into account the expected values that would be obtained if the pressure was 300 psig instead of 147 psig.

The trim reactor increases over-all ethylene conversion from 73.0 percent to 90.5 percent. This results in a 17.5 percent reduction in the volume of ethylene recycle to the loop reactor.

While a certain preferred system has been described for illustrative purposes, the invention is not limited thereto.

We claim:

1. Apparatus for dimerizing olefins comprising in series combination a loop reactor, a trim reactor and a fractionating means, said fractionating means comprising separation means, a weak acid scrubber, a weak alkali scrubber, a drier, a stripper and a fractionating means; said loop reactor being so provided that the reactant charge is recycled through the reaction zone thereof; said trim reactor being of the fixed bed type; first conduit means for introducing feedstock to said loop reactor; second conduit means for introducing catalyst to said loop reactor; third conduit means for connecting said loop reactor with said trim reactor, whereby effluent from said loop reactor is transferred to said trim reactor; fourth conduit means connecting said trim reactor to said separation means for transferring the effluent from said trim reactor to said separation means; fifth conduit means connecting said separation means to said stripper for transferring an overhead portion of the effluent to said stripper; sixth conduit means connecting said separation means to said weak acid scrubber for transferring a bottoms effluent from said separation means to said scrubber; seventh conduit means connecting said weak acid scrubber to said weak alkali scrubber for transferring effluent from said acid scrubber to said alkali scrubber; eighth conduit means connecting said weak alkali scrubber to said drier for transferring effluent from said alkali scrubber to said drier; ninth conduit means connecting said drier to said stripper for transferring effluent from said drier to said stripper; tenth conduit means connecting said stripper to said first conduit for recycling the unreacted charge material; eleventh conduit means connecting said stripper to said fractionating means for transferring effluent from said stripper to said fractionating means; conduit means for withdrawing fractions from said fractionating means.

2. The apparatus of claim 1 wherein said trim reactor is packed with an ion exchange resin.

3. The apparatus of claim 1 wherein said trim reactor is packed with an ion exchange resin containing on the surface thereof a catalyst film.

4. The apparatus of claim 1 wherein said loop reactor contains a catalyst film on the interior walls of said loop reactor.

* * * * *